US007735250B2

(12) United States Patent
Menzie et al.

(10) Patent No.: US 7,735,250 B2
(45) Date of Patent: Jun. 15, 2010

(54) DECORATIVE ELEMENT FOR A PLANTING SYSTEM AND A METHOD OF FORMING A DECORATIVE ELEMENT

(76) Inventors: Tina M. Menzie, 521 E. Greenlawn Ave., Lansing, MI (US) 48910; Shawn R. Menzie, 521 E. Greenlawn Ave., Lansing, MI (US) 48910

( * ) Notice: Subject to any disclaimer, the term of this patent is extended or adjusted under 35 U.S.C. 154(b) by 957 days.

(21) Appl. No.: 11/257,536

(22) Filed: Oct. 25, 2005

(65) Prior Publication Data

US 2006/0107561 A1 May 25, 2006

Related U.S. Application Data

(60) Provisional application No. 60/623,146, filed on Oct. 27, 2004.

(51) Int. Cl.

| | |
|---|---|
| ***G09F 1/00*** | (2006.01) |
| ***A01G 9/02*** | (2006.01) |
| ***A01G 9/10*** | (2006.01) |
| ***A01G 7/00*** | (2006.01) |
| ***A01C 1/04*** | (2006.01) |
| ***A01C 1/00*** | (2006.01) |
| ***A01C 11/00*** | (2006.01) |
| ***A01C 15/00*** | (2006.01) |

(52) U.S. Cl. .............. 40/124.09; 40/124.06; 40/124.01; 47/65.7; 47/56; 47/9; 47/1.01 R; 47/15; 47/58.1 SE; 111/114; 111/200

(58) Field of Classification Search .............. 40/124.09, 40/124.06, 124.01; 47/65.7, 56, 9, 1.01 R, 47/15, 58.15 E, 58.1 SE; 111/114, 200
See application file for complete search history.

(56) References Cited

U.S. PATENT DOCUMENTS

| | | | |
|---|---|---|---|
| 2,039,442 | A | 5/1936 | Mulford |
| 3,316,676 | A | 5/1967 | Legal, Jr. et al. |
| 3,659,396 | A | 5/1972 | Baker |
| 3,678,620 | A | 7/1972 | Voges |
| 3,877,633 | A | 4/1975 | Peck et al. |
| 4,272,919 | A | 6/1981 | Schmidt |
| 4,418,497 | A | 12/1983 | Mastriano |
| 4,910,911 | A | 3/1990 | Ahm |
| 5,101,594 | A | 4/1992 | Ahm |
| 5,158,809 | A | 10/1992 | Proctor |

(Continued)

FOREIGN PATENT DOCUMENTS

DE 298 15 809 U1 12/1998

(Continued)

OTHER PUBLICATIONS

Plantable Paper Wedding Favors—Andover Accents, 1 Page http://web.archive.org/web/20030711185231/andoveraccents.com/Hearts.html, dated Aug. 8, 2005.

(Continued)

*Primary Examiner*—Lesley Morris
*Assistant Examiner*—Syed A Islam
(74) *Attorney, Agent, or Firm*—Howard & Howard Attorneys PLLC

(57) ABSTRACT

A decorative element includes a first layer and a second layer. The decorative element is disposed on an article, both the article and the decorative element being biodegradable. The first layer includes a protective material and the second layer includes at least one seed embedded therein. The first layer is disposed adjacent the second layer. An adhesive comprising a biodegradable material secures the decorative element to the article.

10 Claims, 3 Drawing Sheets

U.S. PATENT DOCUMENTS

| | | | |
|---|---|---|---|
| 5,215,576 A | 6/1993 | Carrick | |
| 5,228,692 A | 7/1993 | Carrick et al. | |
| 5,291,854 A | 3/1994 | Tzanet et al. | |
| 5,651,214 A | 7/1997 | Zucker et al. | |
| 5,746,372 A | 5/1998 | Spence | |
| 5,771,614 A | 6/1998 | Dawson | |
| 6,096,431 A | 8/2000 | Matsudaira et al. | |
| 6,161,331 A | 12/2000 | Lalane | |
| 6,446,386 B1 | 9/2002 | Holloway | |
| 6,523,306 B1 | 2/2003 | Gordon-Clements | |
| 6,926,197 B2 | 8/2005 | Hed et al. | |
| 6,945,785 B2 * | 9/2005 | Sohl et al. | 434/408 |
| 2002/0000064 A1 * | 1/2002 | D'Agnone et al. | 47/1.01 R |
| 2002/0040670 A1 * | 4/2002 | Hornak | 111/114 |
| 2003/0173244 A1 | 9/2003 | Eichman | |
| 2004/0137170 A1 | 7/2004 | Yu | |

FOREIGN PATENT DOCUMENTS

| | | | |
|---|---|---|---|
| DE | 202 14 508 U1 | | 4/2004 |
| GB | 2 281 713 A | | 3/1995 |
| GB | 2281713 A | * | 3/1995 |
| JP | 02-227296 A | | 9/1990 |
| WO | 94/16907 A1 | | 8/1994 |

OTHER PUBLICATIONS

Seed Paper Promotional, Advertising and Marketing Products from Bloomin Promotions, 2 pages; http://web.archive.org/web/20031005230332/www.bloominpromotions.com/products/index.html, dated Aug. 8, 2005.

Plant Me Collection, 2 pages; http://web.archive.org/web/20031002084126/bloomin.com/store/plant_me.html, dated Aug. 8, 2005.

Tree Tags, 1 page; http://web.archive.org/web/20031002084836/bloomin.com/store/tree_tags.html, dated Aug. 8, 2005.

Seed Paper Weeding Favors, 2 pages; http://web.archive.org/web/0415184936/http://www.catinthebathtubpress.com/product_weddings.html, dated Aug. 8, 2005.

Seeded Greeting Cards, 2 pages; http://web.archive.org/web/20030618100116/www.catinthebathtubpress.com/product_seedcards.htm, dated Aug. 8, 2005.

Plant A Memory; Plantable Seed Cards for Weddings and Showers; 3 pages; http://web.archive.org/web/20030602010135/plantamemory.com/scard/plantseed.html, dated Aug. 8, 2005.

Plant A Memory; Wildflower Hears, Butterflies & Weddings Bells; 3 pages; http://web.archive.org/web/20030812220540/plantamemory.com/wbell/bwdbellord.html, dated Aug. 8, 2005.

Project: Handmade Paper Bags; 3 pages; http://web.archive.org/web/20040212175800/www.botanicalpaperworks.com/papersupplies_arti.....html, dated Aug. 8, 2005.

Project: Handmade Stemware Tags; 3 pages; http://web.archive.org/web/20040212175948/www.botanicalpaperworks.com/papersupplies_arti.....html, dated Aug. 8, 2005.

Project: Pyramid Box Favor; 3 pages; http://web.archive.org/web/20040212180239/www.botanicalpaperworks.com/papersupplies_arti.....html, dated Aug. 8, 2005.

Handmade Invitations—Botanical Paper Works, Inc.; 2 pages; http://web.archive.org/web/20040212140213/www.botanicalpaperworks.com/invitations.html, dated Aug. 8, 2005.

Wedding Favors—Botanical Paper Works; 5 pages; http://web.archive.org/web/20040203164440/www.botanicalpaperworks.com/weddingfavors.html, dated Aug. 8, 2005.

Plantable Wildflower Paper and Invitations; 1 page; http://web.archive.org/web/20040206205633/www.botanicalpaperworks.com/gardengts.html, dated Aug. 8, 2005.

Botanical Paper Works: Handmade paper and wedding invitations; 3 pages; http://web.archive.org/web/20031025174538/http://www.botanicalpaperworks.com, dated Aug. 8, 2005.

Heart Flower Seed Ornament, 1 page; http://favorsbyserendipity.com/favors_product_pages/p-sp-004d.html, dated Sep. 15, 2005.

Plantable Seed Ornament, 3 pages; http://prairiewebs.com/paper_seed-cards.html, dated Sep. 15, 2005.

"Seed-Starting Products"; Gardening: Maintenance: Seed-Starting: Home&Garden Television, 3 pages; http://hgtv.com/hgtv/gl_lawns_maintenance/article/0,1785,HGTV_3600_1385239,00.html, dated Sep. 21, 2005.

Seed Bookmark, 1 page; http://store.clemetparks.com/product94.html, dated Sep. 21, 2005.

Handmade Sheets of Paper—Botanical Paper Works, 1 page; http://web.archive.org/web/20041010154542/www.botanicalpaperworks.com/loosesheets-hsp.html, dated Oct. 5, 2005.

How To Make Handmade Paper, 3 pages, http://web.archive.org/web/20041021223018/http://www.seedsofknowledge.com/paper2.html, dated Oct. 19, 2005.

Bloomin'Bugs, 1 page, http://web.archive.org/web/20030801091810/bloomin.com/store/bugs.html, dated Aug. 8, 2005.

Examination Report.

* cited by examiner

DECORATIVE ELEMENT FOR A PLANTING SYSTEM AND A METHOD OF FORMING A DECORATIVE ELEMENT

CROSS REFERENCE TO RELATED APPLICATION

This application claims the benefit of U.S. provisional patent application Ser. No. 60/623,146 which was filed on Oct. 27, 2004, which is hereby incorporated by reference in its entirety.

BACKGROUND OF THE INVENTION

1. Field of the Invention

The subject invention generally relates to a decorative element, more specifically to a planting system having an article with the decorative element disposed thereon.

2. Description of the Prior Art

Planting systems of the type disclosed herein typically include an article, such as a greeting card, the greeting card having folding lines for overlapping pages and a decorative element attached thereon. An example of such a planting system is disclosed in United States Patent Publication 2002/0040670 to Hornak. The planting system includes a greeting card formed from a card stock with indicia disposed thereon. A decorative element is disposed on the greeting card and formed from mixing together a pulp, a quantity of water, and at least one seed. The decorative element is poured in a mold and dried. A first side and a second side of the decorative element include protrusions because the seeds bulge through the pulp. The protrusions make the design of the decorative element difficult to see. An adhesive attaches the decorative element to the greeting card. The adhesive bond is weak for easily detaching the decorative element from the greeting card. The decorative element is placed into soil to allow the seeds to germinate, while the greeting card is retained as a keepsake that may eventually be discarded into the trash.

Although the prior art has developed an improved planting system, there remains an opportunity to develop a planting system that avoids the potential drawbacks of the protrusions in decorative element and disposing of the greeting card.

SUMMARY OF THE INVENTION

The invention provides for a decorative element disposed on an article, both being biodegradable. The decorative element includes a first layer and a second layer, in which the first layer is disposed adjacent the second layer. The second layer includes at least one seed disposed therein and the first layer forms a raised surface. The first layer includes a protective material for protecting the seeds in the second layer. An adhesive comprising a biodegradable material secures the decorative element to the article.

The invention also provides a method of forming a decorative element. The method comprises the steps of forming a first layer having a first side and a second side and comprising a first biodegradable material, forming a second layer having a first side and a second side and comprising a second biodegradable material, the second biodegradable material having at least one seed embedded therein, the first side of the second layer being disposed adjacent the second side of the first layer, and forming the decorative element.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
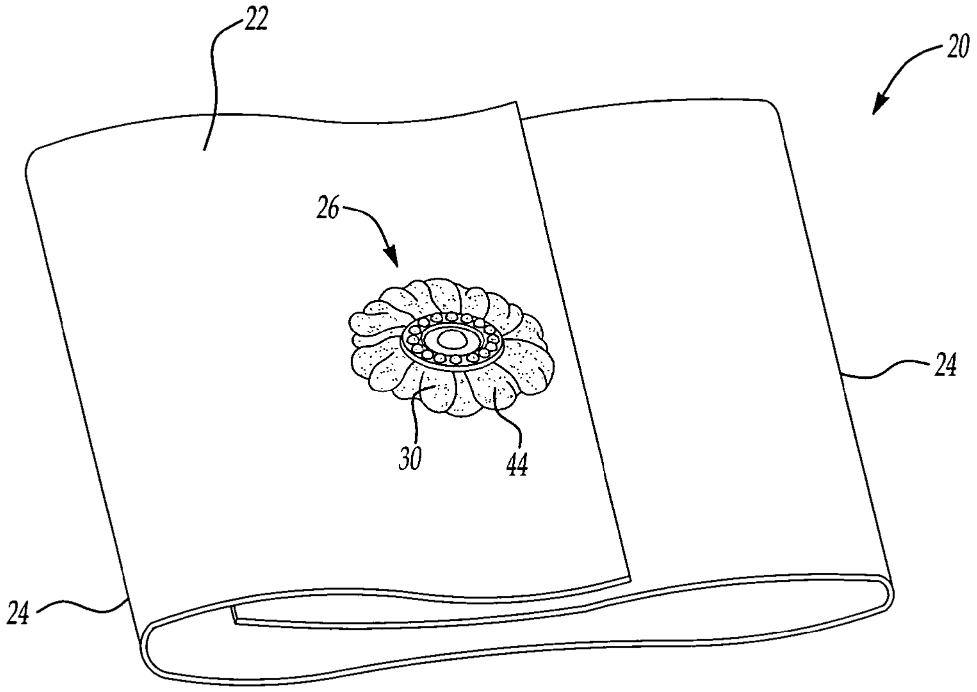
FIG. 1 is a perspective view of a greeting card having a decorative element disposed thereon.

Referring to the Figures, wherein like numerals indicate corresponding parts throughout the several views, a decorative element is generally shown at 26 in FIG. 1. The decorative element 26 will be further discussed below in a planting system 20.

The planting system 20 includes an article and the decorative element 26 disposed thereon. The article may include, but is not limited to, a greeting card, a post card, a gift bag, a gift box, a bookmark, an ornament, a necklace, a calendar, a ribbon, or a wrapping paper. The article will be discussed below as a greeting card 22.

As shown in FIG. 1, the greeting card 22 has folding lines 24 for overlapping pages and the decorative element 26 is disposed on one of the pages. The greeting card 22 may be disposed in an envelope (not shown) for delivering the greeting card 22 to a recipient. The greeting card 22, the decorative element 26, and the envelope are biodegradable and each comprise a pulp to provide a mulch for the planting system. The pulp may include paper, hemp, cotton, cellulose, abaca, coloring, or any other biodegradable material known in the art.

Figure 3A:
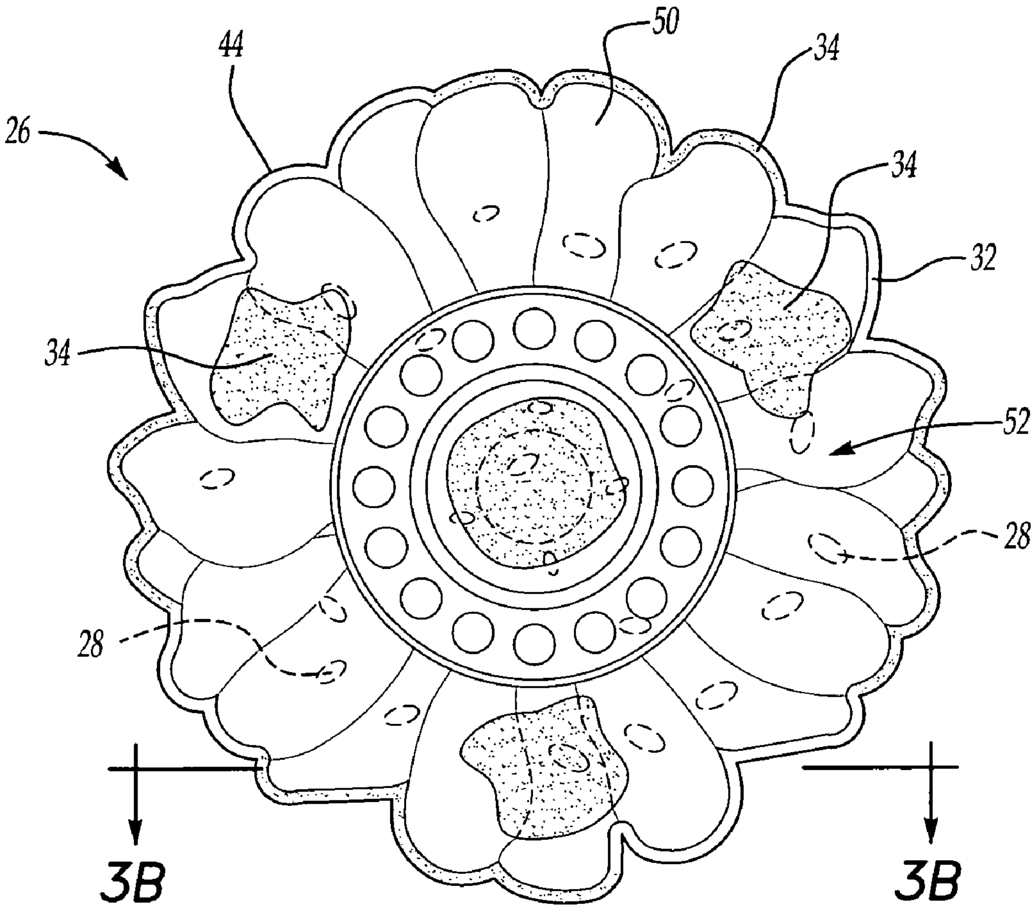
FIG. 3A is a bottom view of the decorative element.
Figure 3B:
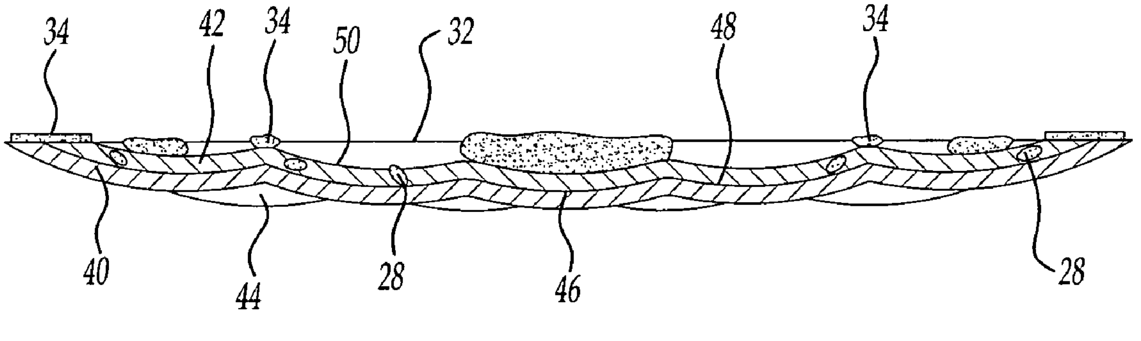
FIG. 3B is a sectional view of the decorative element.

Referring to FIGS. 3A and 3B, the decorative element 26 includes a first layer 40 and a second layer 42, both first and second layers 40, 42 are biodegradable. The first layer 40 includes a first side 44 and a second side 46 in a spaced and parallel relationship. The first layer 40 further includes a protective material. The protective material may include a cellulose and the pulp. However, it is to be appreciated that the protective material may include, any material similar to cellulose, paper, hemp, cotton, abaca, coloring, or any other biodegradable material known in the art. The first layer 40 prevents discoloring of the pulp and provides a protective barrier for the second layer 42.

The second layer 42 includes a first side 48 and a second side 50 in a spaced and parallel relationship. The second layer 42 includes the pulp and at least one seed 28 disposed therein. Preferably, the first layer 40 is disposed adjacent the second layer 42. More preferably, the first layer 40 is disposed adjacent the first side 48 of the second layer 42. Most preferably, the second side 46 of the first layer 40 is disposed adjacent the first side 50 of the second layer 42. It is contemplated that the second layer 42 may be disposed entirely over the first layer 40 or partially over the first layer 40.

As best shown in FIGS. 1, 3A, and 3B, the first layer 40 of the decorative element 26 includes a raised surface 30, wherein the raised surface 30 projects outwardly away from the second layer 42. The second side 50 of the second layer 42 may define a cavity 52 to provide space for the seeds 28 and give the decorative element 26 a three dimensional appearance. However, it is to be appreciated that the second side 50 of the second layer 42 may be concave, undulated, or define grooves.

Figure 2:
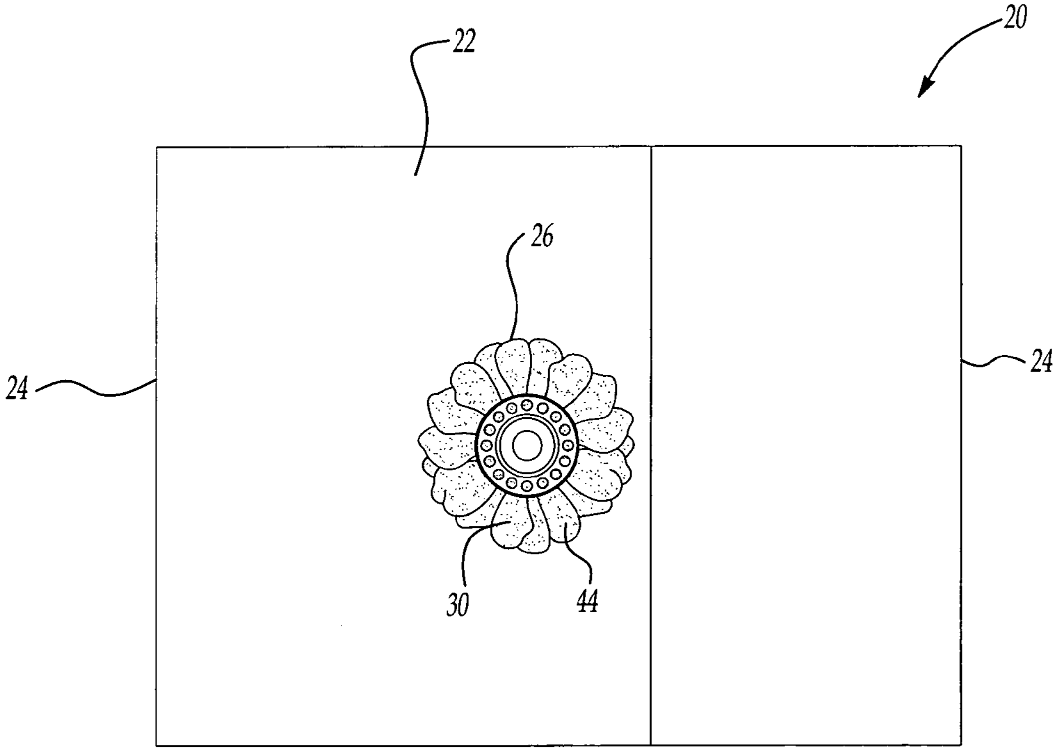
FIG. 2 is a top view of the greeting card having the decorative element disposed thereon.

Referring to FIGS. 2, 3A, and 3B, an adhesive 34 comprising a biodegradable material secures the decorative element 26 to the greeting card 22. The decorative element 26 includes a periphery 32, wherein the adhesive 34 is disposed thereon. Additionally, the adhesive 34 is disposed on the second side 50 of the second layer 42. It is to be appreciated that the adhesive 34 may be disposed entirely over the periphery 32 and the second side 50 of the second layer 42 or partially disposed over the periphery 32 and the second side 50 of the second layer 42. The adhesive 34 may include a wheat paste. Alternatively, the adhesive 34 may include cellulose or any other biodegradable adhesive known in the art.

Figure 4:
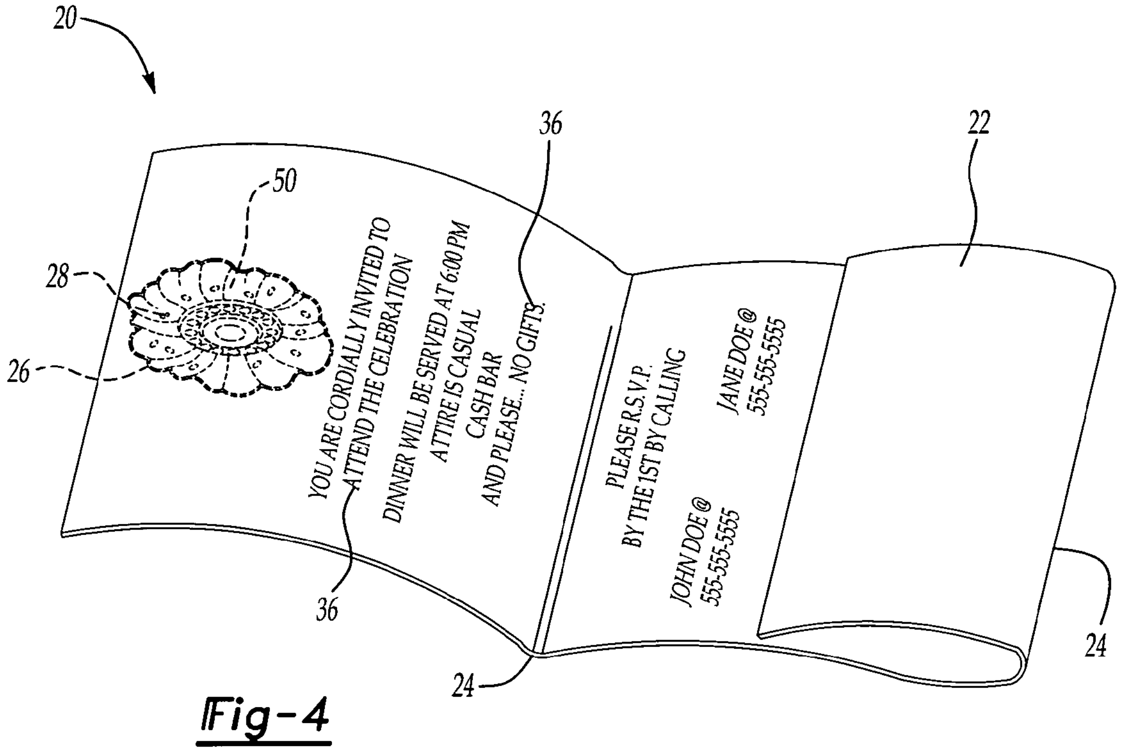
FIG. 4 is a perspective view of the greeting card partially opened.

Referring to FIG. 4, indicia 36 may be disposed on the greeting card 22 for providing information. The indicia 36 includes an ink, wherein the ink is biodegradable. The ink includes an oil. The oil may include a vegetable oil, such as a soybean oil. However, it is contemplated that the vegetable oil may include: a cashew oil, a castor bean oil, a flax seed oil, a hemp oil, a mustard oil, a poppy seeds oil, a rapeseed oil, a safflower oil, a sesame seed oil, a sunflower oil, an almond oil, an apricot oil, an avocado oil, a corn oil, a cotton plant seed oil, a coconut oil, a fusarium oil, a hazelnut oil, a neem oil, an olive oil, a palm oil, a palm kernel oil, a peanut oil, a pumpkin seed oil, a rice bran oil, a walnut oil, and combinations thereof.

The subject invention also includes a method of forming a decorative element 26 having a first layer 40 and a second layer 42. The first layer 40 includes a first side 44 and a second side 46 and comprises a first biodegradable material. The first biodegradable material is formed by mixing a pulp and a quantity of water together and draining the mixture and adding cellulose. The first biodegradable material is introduced into a mold and allowed to set. It is to be appreciated that the first biodegradable material may be introduced into the mold by pouring, spreading, or any other acceptable way known in the art.

Figure 5:
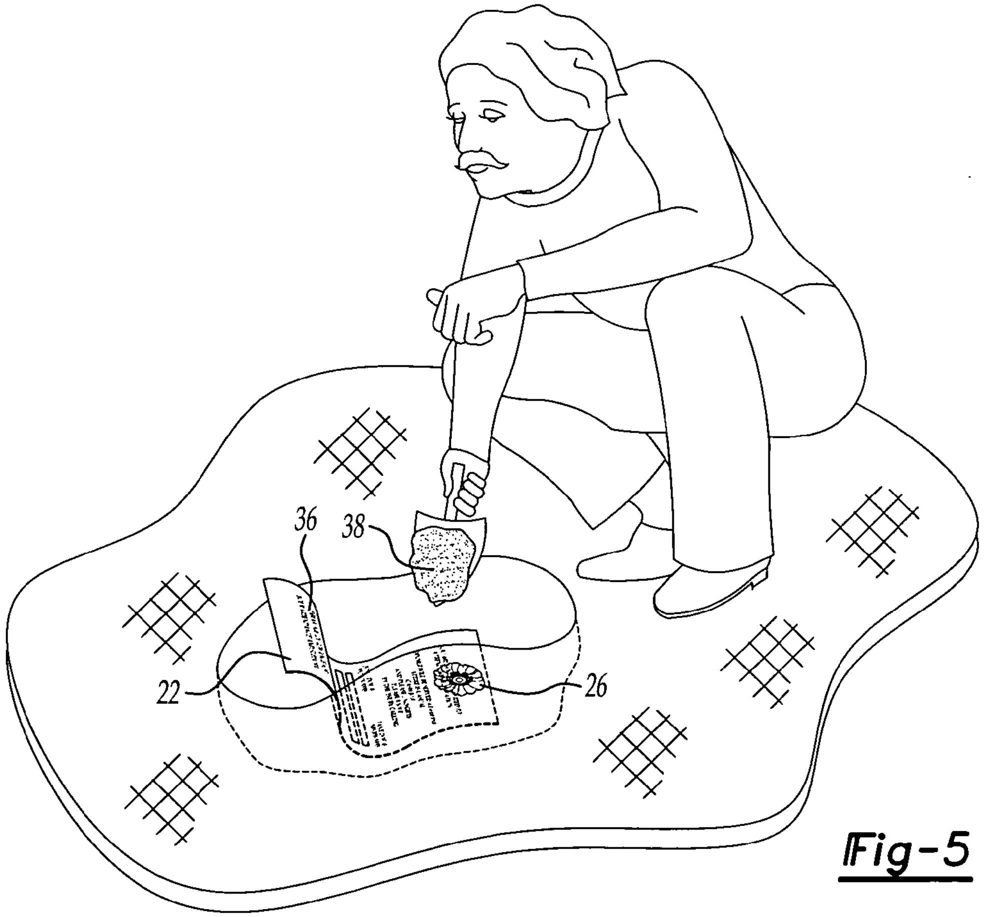
FIG. 5 is a perspective view of placing the greeting card into soil.

The second layer 42 includes a first side 48 and a second side 50 and comprises a second biodegradable material. The second biodegradable material is formed by mixing the pulp and the quantity of water together and draining the mixture and adding at least one seed 28. The second biodegradable material is introduced into the mold adjacent the second side 46 of the first layer 40. More specifically, the first side 48 of the second layer 42 is disposed adjacent the second side 46 of the first layer 40. It is to be appreciated that the first biodegradable material may be introduced into the mold by pouring, spreading, or any other acceptable way known in the art. The first and second layers 40, 42 are pressed together to form the decorative element 26. It is contemplated that the decorative element 26 may be press molded, stamp molded, or molded from any other acceptable method known in the art. An adhesive 34 is disposed on the second side 50 of the second layer 42 to attach the decorative element 26 to an article, such as a greeting card 22. When it is time to discard the greeting card 22, place soil 38 over the decorative element 26 and the greeting card 22 to germinate the seeds 28, as shown in FIG. 5.

Obviously, many modifications and variations of the present invention are possible in light of the above teachings. The invention may be practiced otherwise than as specifically described within the scope of the appended claims.

What is claimed is:

1. An element which may be used in a planting system including an article, the element comprising:

a first layer constructed of a substantially solid biodegradable material including an inner surface portion and an outer surface portion and a protective barrier layer substantially along the inner surface portion of the first layer;

a second layer constructed of a substantially solid biodegradable material including pulp for providing a mulch and at least one seed substantially fixed therein, the second layer including an inner surface portion in contact with the protective barrier layer and an outer surface portion upon which a biodegradable adhesive material may be applied for attaching the outer surface of the second layer to the article;

wherein the first and second layers are molded together to form a solid unitary body having a plurality of complementary features shared by the first and second layers, including one or more raised portions, one or more recessed portions and an outer periphery including one or more arcuate side wall portions cooperating together to form a multi-dimensional decorative body shape.

2. An element as set forth in claim 1 wherein said protective barrier layer comprises a cellulose.

3. An element as set forth in claim 1 wherein said protective barrier layer further comprises a pulp.

4. An element as set forth in claim 1 further comprising a cavity defined between the protective barrier layer and the inner surface portion of the second layer for storing seeds therein.

5. An element as set forth in claim 1 wherein said adhesive comprises cellulose.

6. An element as set forth in claim 1 wherein said adhesive comprises a wheat paste.

7. An element as set forth in claim 1 wherein the article comprises a pulp.

8. An element as set forth in claim 1 further comprising indicia disposed on the element.

9. An element as set forth in claim 8 wherein the indicia comprises a biodegradable ink.

10. An element as set forth in claim 1 wherein the article comprises one of a greeting card, a post card, a gift bag, a gift box, a bookmark, an ornament, a necklace, a calendar, a ribbon, or a wrapping paper.

* * * * *